(12) United States Patent
Roach

(10) Patent No.: US 9,296,461 B1
(45) Date of Patent: Mar. 29, 2016

(54) SUPERPRESSURE POLYETHYLENE BALLOON WITH LOAD TAPES

(71) Applicant: Google Inc., Mountain View, CA (US)

(72) Inventor: Kevin Roach, San Jose, CA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/036,933

(22) Filed: Sep. 25, 2013

(51) Int. Cl.
*B64B 1/40* (2006.01)

(52) U.S. Cl.
CPC .......................................... *B64B 1/40* (2013.01)

(58) Field of Classification Search
CPC .............. B64B 1/14; B64B 1/18; B64B 1/40; B64B 1/58
See application file for complete search history.

(56) References Cited

U.S. PATENT DOCUMENTS

| | | | | | |
|---|---|---|---|---|---|
| 1,553,340 | A | * | 9/1925 | Upson | 244/31 |
| 2,767,940 | A | * | 10/1956 | Melton | 244/31 |
| 2,771,256 | A | * | 11/1956 | Ryan | 244/31 |
| 2,960,282 | A | * | 11/1960 | Winzen | 244/31 |
| 4,529,153 | A | * | 7/1985 | Conn | 244/126 |
| 4,877,205 | A | | 10/1989 | Rand | |
| 5,992,795 | A | | 11/1999 | Tockert | |
| 6,234,425 | B1 | | 5/2001 | Rand et al. | |
| 6,290,172 | B1 | * | 9/2001 | Yajima et al. | 244/31 |
| 2002/0005457 | A1 | | 1/2002 | Lee et al. | |
| 2006/0192054 | A1 | | 8/2006 | Lachenmeier | |
| 2009/0220726 | A1 | * | 9/2009 | Liggett et al. | 428/77 |
| 2010/0269673 | A1 | * | 10/2010 | Levesque | 87/8 |

FOREIGN PATENT DOCUMENTS

| | | | | | |
|---|---|---|---|---|---|
| EP | 2145821 | A2 | * | 1/2010 | ................ B64B 1/44 |
| GB | 601919 | A | * | 5/1948 | ................ B64B 1/58 |
| GB | 1332536 | A | * | 10/1973 | ................ B64B 1/40 |

* cited by examiner

*Primary Examiner* — Tien Dinh
*Assistant Examiner* — Christopher Hutchens
(74) *Attorney, Agent, or Firm* — McDonnell Boehnen Hulbert & Berghoff LLP

(57) ABSTRACT

A balloon having a balloon envelope formed with a plurality of adjacent envelope gores sealed together at their respective edges to form an edge seam between each of the adjacent envelope gores, a tape comprised of fibers applied to a centerline of each of the envelope gores, wherein the envelope gores are constructed such that the edge seam between each of the adjacent envelope gores is longer than the centerline of each of the envelope gores, and wherein a load caused by pressurized lifting gas within the balloon envelope is carried primarily by the fiber tapes on the centerlines of the envelope gores, rather than the edge seams between the adjacent envelope gores.

23 Claims, 8 Drawing Sheets

SUPERPRESSURE POLYETHYLENE BALLOON WITH LOAD TAPES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon is provided that is formed with a plurality of envelope gores that are seamed together, where the centerlines of the respective envelope gores are shorter than the edge seams between adjacent envelope gores. A tendon is positioned on the centerline of each of the respective envelope gores, and the tops of the envelope gores are secured to a load ring positioned at the top of the balloon envelope. A load caused by pressurized lifting gas within the balloon envelope is carried primarily by the tendons positioned on the centerlines of the envelope gores, rather than the edge seams between the adjacent envelope gores. The tendon may be formed as a fiber load tape that is adhered to the centerline of the respective envelope gores. Alternately, a tubular sleeve may be adhered to the centerlines of the respective envelopes with the tendon positioned within the tubular sleeve. The tendon could take the form of a fiber tape positioned within the sleeve or a straight fiber cable positioned within the sleeve.

In one aspect, a balloon is provided having a balloon envelope formed with a plurality of adjacent envelope gores sealed together at their respective edges to form an edge seam between each of the adjacent envelope gores, a tape comprised of fibers applied to a centerline of each of the envelope gores, wherein the envelope gores are constructed such that the edge seam between each of the adjacent envelope gores is longer than the centerline of each of the envelope gores, and wherein a load caused by pressurized lifting gas within the balloon envelope is carried primarily by the fiber tapes on the centerlines of the envelope gores, rather than the edge seams between the adjacent envelope gores.

In another aspect, a method of forming a balloon envelope is provided including the steps of positioning a first envelope gore having a first edge and a second edge adjacent a second envelope gore having a first edge and a second edge, sealing the second edge of the first envelope gore to the first edge of the second envelope gore to form a first edge seam, adhering a first fiber tape to a centerline of the first envelope gore, wherein the first edge seam has a length that is longer than a length of the centerline of the first envelope gore, positioning a third envelope gore having a first edge and a second edge adjacent the second envelope gore, sealing the second edge of the second envelope gore to the first edge of the third envelope gore to form a second edge seam, adhering a second fiber tape to a centerline of the second envelope gore, wherein the second edge seam has a length that is longer than a length of the centerline of the second envelope gore, positioning a final envelope gore having a first edge and a second edge adjacent the first envelope gore, sealing the second edge of the final envelope gore to first edge of the first envelope gore to form a final edge seam, and adhering a final fiber tape to a centerline of the final envelope gore, wherein the final edge seam has a length that is longer than a centerline of the final envelope.

In another aspect, a balloon is provided having a balloon envelope formed with a plurality of adjacent envelope gores sealed together at their respective edges to form an edge seam between each of the adjacent envelope gores, a tubular sleeve adhered to a centerline of each of the envelope gores, a tendon positioned within each of the respective tubular sleeves, wherein the envelope gores are constructed such that the edge seam between each of the adjacent envelope gores is longer than the centerline of each of the envelope gores, and wherein a load caused by pressurized lifting gas within the balloon envelope is carried primarily by the tendons on the centerlines of the envelope gores, rather than the edge seams between the adjacent envelope gores.

In a further aspect, a balloon envelope is provided having means for primarily carrying a load caused by pressurized lifting gas within the balloon envelope on the centerlines of the envelope gores, rather than the edge seams between the adjacent envelope gores.

These as well as other aspects, advantages, and alternatives, will become apparent to those of ordinary skill in the art by reading the following detailed description, with reference where appropriate to the accompanying drawings.

DETAILED DESCRIPTION

Figure 1:
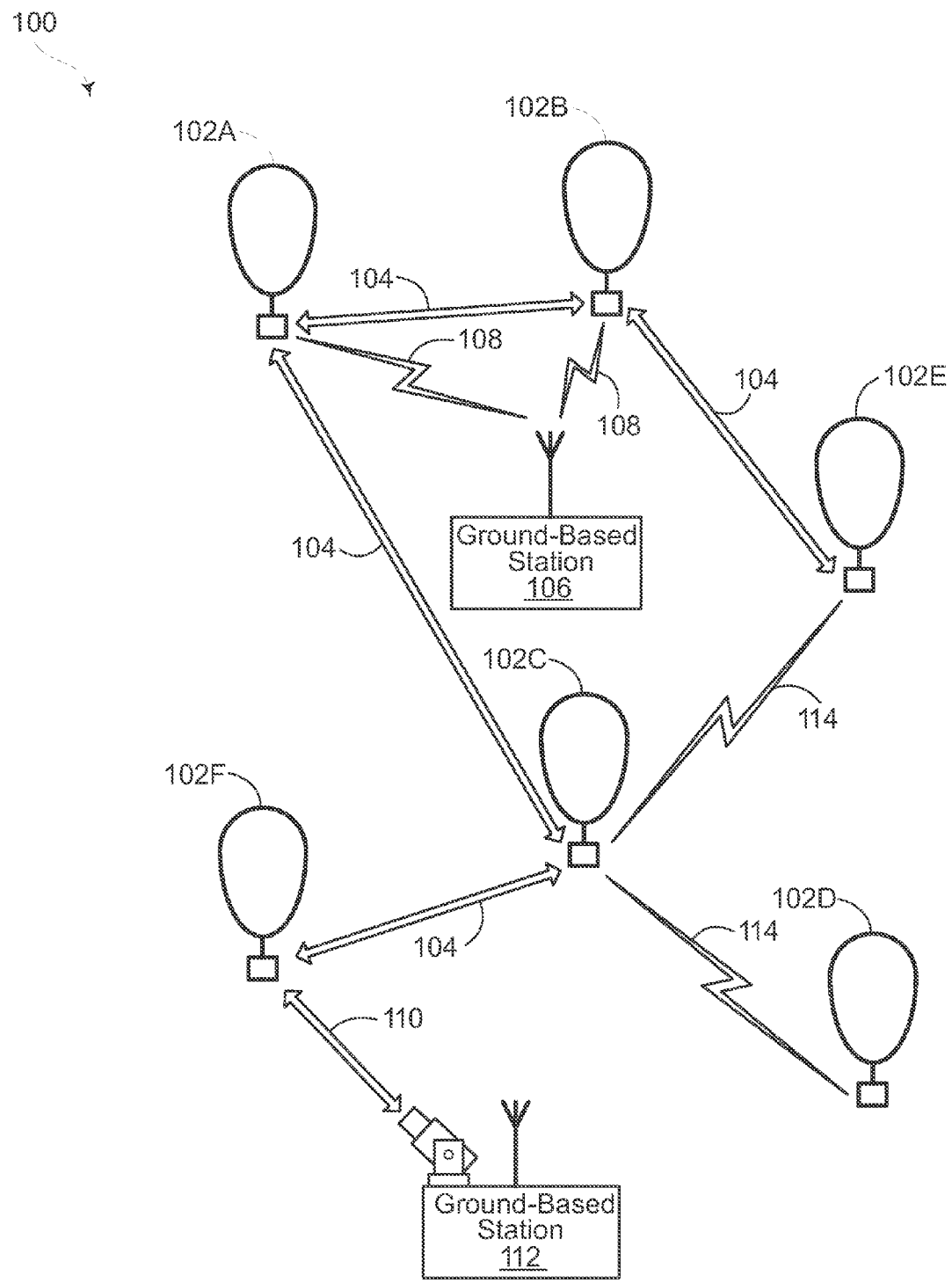
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include an envelope and a payload. The balloon envelope is filled with a pressurized lifting gas, such as helium or hydrogen, to provide buoyancy to the balloon and to maintain the balloon envelope aloft. It will be appreciated that the lifting gas must provide a sufficient lift force to raise the balloon envelope to a desired altitude, and to maintain a desired altitude. As a result, it is desirable to make the components of the balloon system, including the balloon envelope, as lightweight as possible, as the lighter the balloon system the less lift force is required from the lifting gas. There is a trade-off between envelope weight and envelope strength. Thus, a thicker or stronger envelope material may provide for greater strength but at a cost of an increase in overall weight of the balloon system. To reduce the overall weight of the balloon system, however, it is desirable to provide a lightweight balloon envelope.

In view of these goals, the envelope may be comprised of a thin film, such as polyethylene or polyethylene terephthalate, which is lightweight yet has suitable strength properties for use as a balloon envelope. Nonetheless, to provide additional strength and stability to the balloon system, a series of spaced tendons that run longitudinally from the top of the balloon envelope to the bottom of the balloon envelope may be used. However, the tendons around the outside of the envelope tend to slip relative to the envelope unless they are held rigid relative to each other or to the balloon envelope. One approach is to use tendons comprised of braided fiber ropes which may be positioned within longitudinal sealed edge seam sleeves on the exterior of the balloon envelope.

However, as noted in more detail below, it may be desirable to position the longitudinal tendons on the centerlines of the respective envelope gores, rather than on the edge seams between adjacent envelope gores, and thus without using edge seam sleeves formed at the edge seams between adjacent envelope gores. This design of positioning the tendons at the centerlines of the gores allows for reduced stress and strain on the balloon envelope, as the load is designed to be carried primarily by the tendons positioned on the centerlines of the respective envelope gores, rather than the edge seams of the adjacent envelope gores.

One approach to affixing the longitudinal tendons to the centerlines of the envelope gores is to use tape tacks that are adhered to the balloon envelope. However, the tape tacks are not that strong and do not adhere well to the balloon envelope. As a result, forces on the tape tacks cause slippage which can unseat the tape tacks or tendons, leading to buckling and rolling of the tendons, or even the pulling loose of the tape tacks that can cause damage to the balloon envelope.

Furthermore, while the braided tendons that have been used as longitudinal tendons tend to advantageously stretch under loading, they tend to have less strength than straight fibers, as straight fibers are less prone to creep rupture and are stronger under uni-axial loading. Therefore, it would be desirable to come up with a method of forming a balloon envelope without using tendon edge seam sleeves or tape tacks, and that could utilize straight fibers for increased strength.

Example embodiments may be directed to forming an envelope using a series of envelope gores that are seamed together using a heat sealing process. The individual envelope gores may be shaped so that the length of the seam connecting adjacent envelope gores is greater than the length of the centerline of the envelope gores. Thus, the envelope gores may be shaped to better optimize the strain rate experienced by the balloon envelope.

In addition, instead of using edge seam sleeves with enclosed tendons, or even braided tendons, a wide tape comprised of straight fibers may be used in place of tendons. Thus, straight fibers, such as dyneema fibers or UV resistant aramid fibers may be aligned into a wide tape. A pressure sensitive adhesive may be placed on the back side of the wide tapes. Then, the wide tapes of straight fibers may be applied to and adhered to the centerlines of the respective envelope gores to serve as an alternative to the use of longitudinal tendons, or longitudinal tendons housed in edge seam sleeves.

An alternate solution to the tape tack problem is to adhere a narrow, adhesive backed polyethylene tube or sleeve to the centerline of the respective envelope gores. A longitudinal tendon may then be placed within the tubular sleeve. The tendon may be a straight fiber cable or it could be a fiber tape positioned within the sleeve. The use of a tube allows for some horizontal slop in tendon movement and also keeps the tendon free of the adhesive portions.

Thus, two approaches may be used to position a tendon on the centerlines of the respective envelope gores without utilizing edge seams formed at the edge seams of the respective envelope gores and without using tape tacks. In the first approach, a straight fiber tape may be adhered directly to centerlines of the respective envelope gores. In the second approach, a tubular sleeve is adhered to the centerlines of the respective envelope gores. A longitudinal tendon may then be placed within the tubular sleeve. The tendon may be a straight fiber cable or it could be a fiber tape positioned within the sleeve.

The heat sealing of the individual envelope gores to form edge seams between adjacent envelope gores, and application of the straight fiber tape to the centerlines of the envelope gores is easier to automate than the prior approach of using tape tacks to adhere the braided tendons to the balloon envelope. Thus, this balloon envelope design, and the method of making this balloon envelope design, could utilize a manufacturing process that is more automated and able to be converted to machine production, allowing for an increase in production volume and a reduction in costs. The repetitive steps of heat sealing the adjacent envelope gores and applying the fiber tapes (or tubular sleeves) to the centerlines of the envelope gores can be more readily machine controlled for tolerances.

Furthermore, the individual envelope gores may be shaped so that the length of the seam connecting adjacent envelope gores is greater than the length of the centerline of the envelope gores. Therefore, when inflated, there is an excess of envelope material (that includes the edge seam between adjacent envelope gores) between the respective longitudinal fiber tapes that bulges out somewhat before there is any strain on the envelope material, as the load is instead applied to the shortest section of the envelope gore—the centerline where the longitudinal fiber load tapes has been applied (or where the tendon within the tubular sleeve is positioned). Thus, the balloon envelope may take on more of a "pumpkin" shape with the edge seams of the respective envelope gores bulging outward between the respective longitudinal fiber load tapes (or tendons within tubular sleeves). This design allows for reduced stress and strain on the balloon envelope, as the load is designed to be carried primarily by the longitudinal fiber load tapes (or tendons within tubular sleeves), rather than the balloon envelope material.

Using longitudinal fiber load tapes, instead of tendons positioned with tape tacks, reduces the risk of tangling, sliding, and uneven deployment during superpressure transition, as well as during handling and shipping.

In some embodiments, it may be desirable to have the coefficient of thermal expansion (CTE) of the fiber load tapes closely match the CTE of the envelope material. In this manner, the balloon systems can operate during the extreme environmental temperature ranges experienced when the balloon envelope is deployed at altitude.

In addition, different items may be attached to the fiber load tapes or tubular sleeves without directly contacting the balloon envelope. Furthermore, the fiber load tapes or tubular sleeves may also include one or more metallic, reflective fibers that could make the balloon system visible to aircraft or to serve as an antenna.

2. EXAMPLE BALLOON NETWORKS

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Example Balloon Configuration

Figure 2:
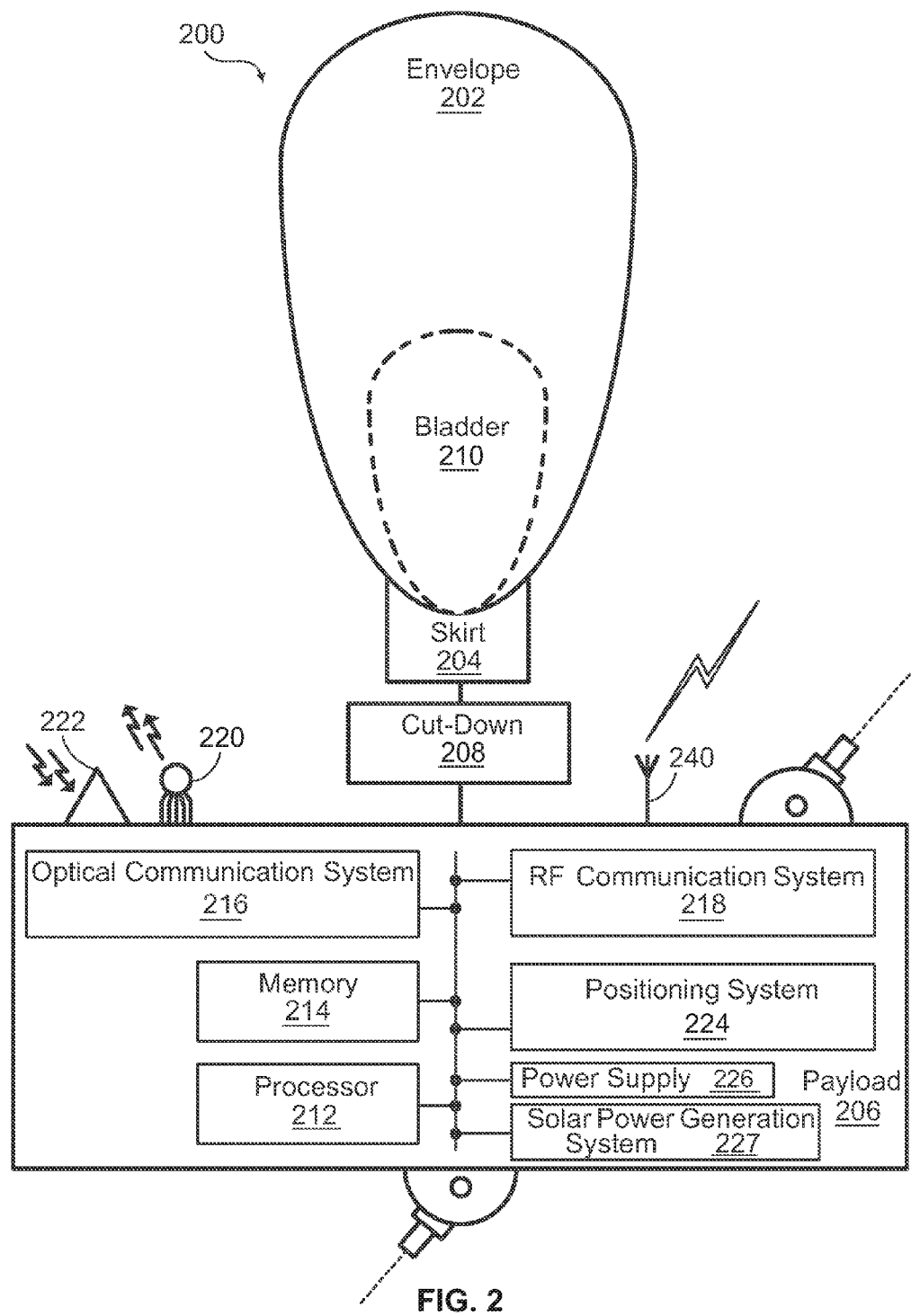
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 2 shows a high-altitude balloon 200, according to an example embodiment. As shown, the balloon 200 includes an envelope 202, a skirt 204, a payload 206, and a cut-down system 208, which is attached between the balloon 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. EXAMPLE OF A BALLOON ENVELOPE

As disclosed in FIGS. 3-8, the present embodiments provide a balloon envelope 10 to which a payload 82 may be attached. The balloon envelope 10 is filled with a pressurized lifting gas, such as helium or hydrogen, to provide buoyancy to the balloon and to maintain the balloon envelope 10 aloft. In view of the goal of making the balloon envelope 10 as lightweight as possible, the balloon envelope is comprised of a plurality of envelope gores comprised of a thin film, such as polyethylene or polyethylene terephthalate, which is lightweight yet has suitable strength properties for use as a balloon envelope. FIGS. 3-8 show the embodiment where the approach of adhering fiber load tapes directly to the centerlines of the respective envelope gores is used. However, it will be appreciated that the second approach of adhering a tubular sleeve to the centerlines of the respective gores having a tendon positioned within the tubular sleeves could also be used in FIGS. 3-8.

Figure 3:
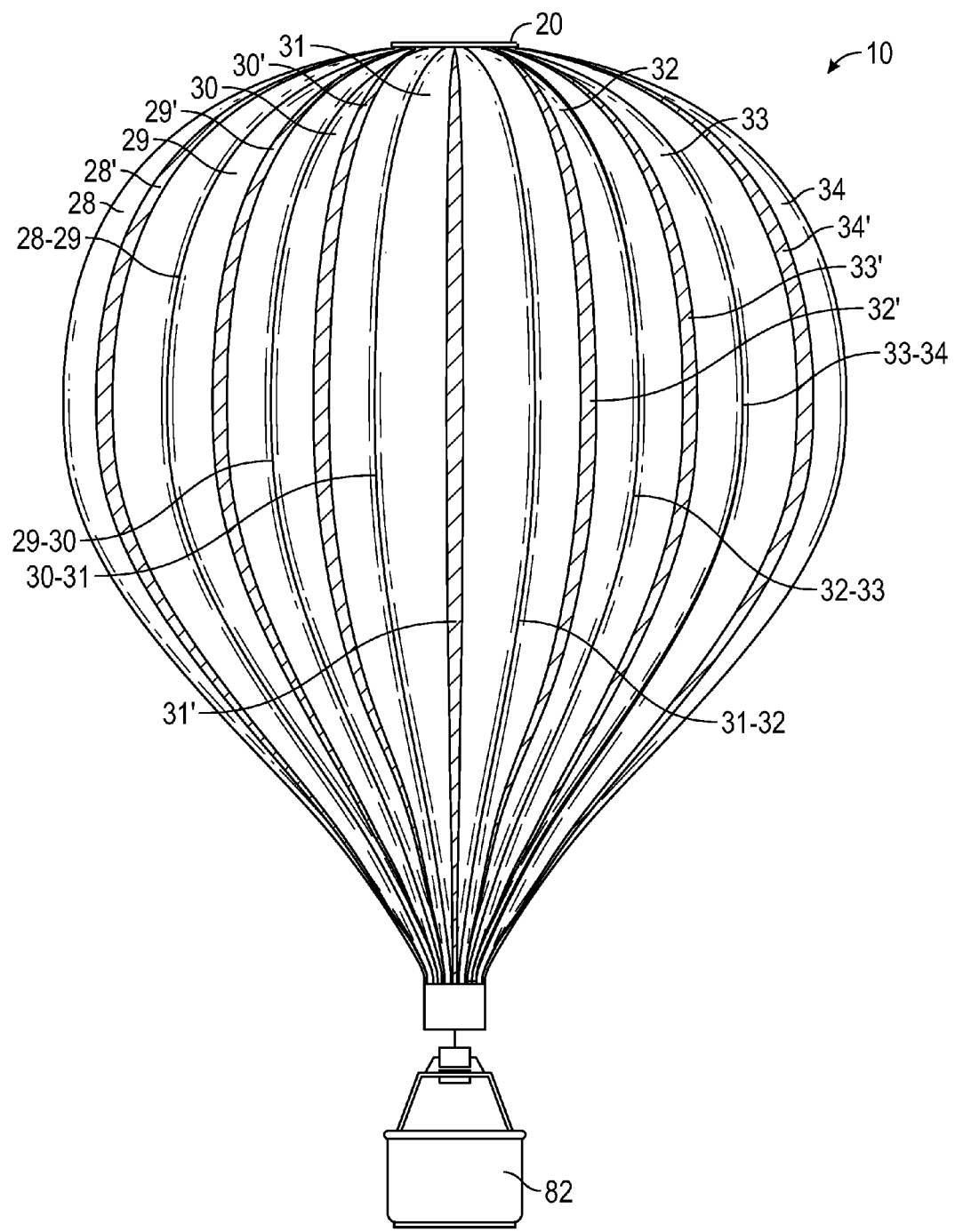
FIG. 3 shows a perspective view of a balloon envelope 10 comprised of a plurality of envelope gores having fiber load tapes extending down the centerline of the respective gores, according to an example embodiment.

FIG. 3 shows a perspective view of a balloon envelope 10 comprised of a plurality of envelope gores having fiber load tapes extending down the centerline of the respective gores, according to an example embodiment. In particular, balloon envelope 10 is comprised of envelope gore 30 that is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In a preferred embodiment, the envelope gores are comprised of polyethylene having a thickness of 1.5 to 2 mils. Each of the respective envelope gores extend to balloon apex 20.

The individual envelope gores 28-34 may be shaped so that the length of the edge seam connecting adjacent envelope gores is greater than the length of a centerline of the envelope gores. Thus, the envelope gores may be shaped to better optimize the strain rate experienced by the balloon envelope. The pressurized lifting gas within the balloon envelope causes a force or load to be applied to the balloon envelope.

As noted above, in some embodiments longitudinal tendons may be used to provide strength to the balloon envelope and to help withstand the load created by the pressurized gas within the balloon envelope. However, a wide tape comprised of straight fibers may advantageously be used in place of tendons. Straight fibers, such as dyneema fibers or UV resistant aramid fibers may be aligned into a wide tape. A pressure sensitive adhesive may be placed on the back side of the wide tapes. Then, the wide tape of straight fibers may be applied to and adhered to the centerlines of the respective gores. Example embodiments may include a 78000 denier dyneema fiber tape with a 4500 pound load capacity or a jacketed aramid straight fiber cable with a 3000 pound load capacity.

As shown in FIG. 3, fiber load tape 28' is shown positioned on a centerline of envelope gore 28, fiber load tape 29' is shown positioned on a centerline of envelope gore 29, fiber load tape 30' is shown positioned on a centerline of envelope gore 30, fiber load tape 31' is shown positioned on a centerline of envelope gore 31, fiber load tape 32' is shown positioned on a centerline of envelope gore 32, fiber load tape 33' is shown positioned on a centerline of envelope gore 33, and fiber load tape 34' is shown positioned on a centerline of envelope gore 34.

Furthermore, the individual gores 28-34 are shaped so that the length of the edge seam connecting adjacent gores is greater than the length of the centerline of the gores. Therefore, when inflated, there is an excess of envelope material (that includes the edge seams between the adjacent envelope gores) that bulges out somewhat before there is any strain on the envelope material. Therefore, the load is instead applied to the shortest section of the gore—the centerline of the adjacent gores 28-34 where the longitudinal fiber load tapes 28'-34' are applied. Thus, the balloon envelope 10 takes on more of a "pumpkin" shape with the edge seams 28-29, 29-30, 30-31, 31-32, 32-33, and 33-34 of the respective envelope gores bulging outward between the respective longitudinal fiber load tapes 28'-34'. This design allows for reduced stress and strain on the balloon envelope 10, as the load is designed to be carried primarily by the longitudinal fiber load tapes 28'-34', rather than the balloon envelope material in envelope gores 28-34.

Using longitudinal fiber load tapes, instead of tendons positioned with tape tacks, reduces the risk of tangling, sliding, and uneven deployment during superpressure transition, as well as during handling and shipping.

Figure 4A:
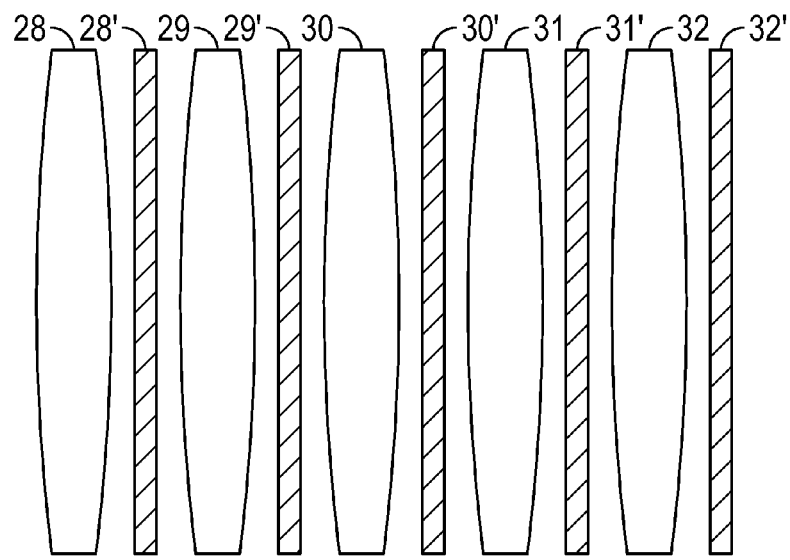
FIG. 4A shows a side view of the respective envelope gores and fiber load tapes prior to forming balloon envelope 10 in FIG. 3, according to an example embodiment.

FIG. 4A shows a side view of the respective envelope gores 28-32 and fiber load tapes 28'-32' prior to forming balloon envelope 10 in FIG. 3, according to an example embodiment. In particular, envelope gore 28 is shown prior to attachment to adjacent envelope gore 29 and prior to the placement of fiber load tape 28' onto envelope gore 28; envelope gore 29 is shown prior to attachment to adjacent envelope gores 28 or 30 and prior to the placement of fiber load tape 29' onto envelope gore 29, envelope gore 30 is shown prior to attachment to adjacent envelopes gore 29 and 31 and prior to the placement of fiber load tape 30' onto envelope gore 30, envelope gore 31 is shown prior to attachment to adjacent envelope gores 30 and 32 and prior to the placement of fiber load tape 31' onto envelope gore 31, and envelope gore 32 is shown prior to attachment to adjacent envelope gore 31 and prior to the placement of fiber load tape 32' onto envelope gore 32.

Figure 4B:
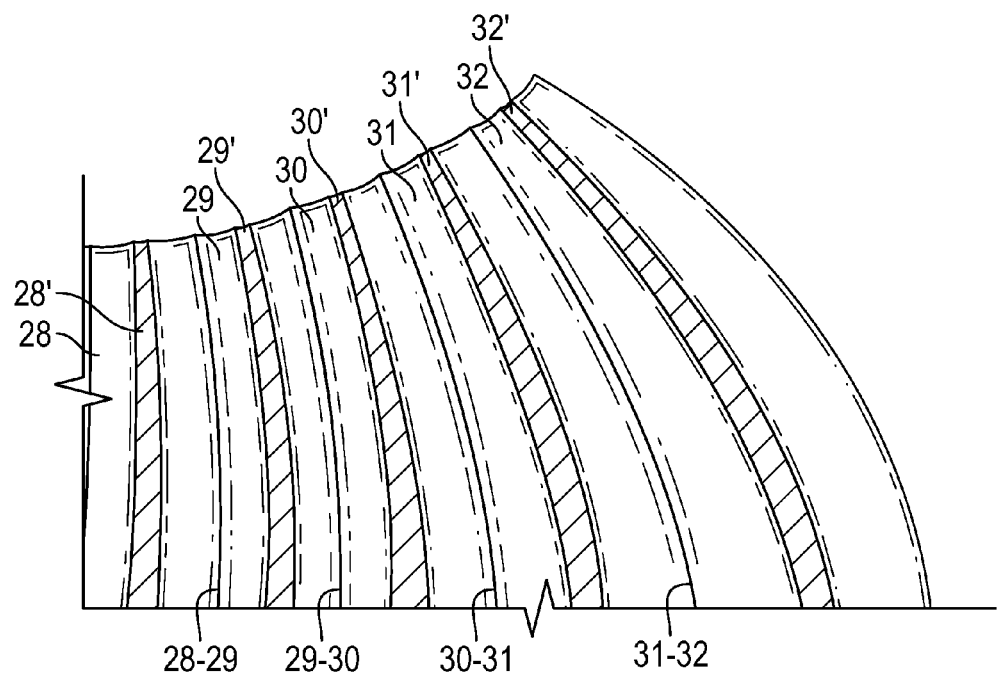
FIG. 4B shows a side view of the respective envelope gores and fiber load tapes shown in FIG. 4A after the adjacent envelope gores have been seamed together and after the fiber load tapes have been positioned on the centerlines of the respective envelope gores.

FIG. 4B shows a side view of the respective envelope gores 28-32 and fiber load tapes 28'-32' shown in FIG. 4A after the adjacent gores 28-32 have been seamed together and after the fiber load tapes 28'-32' have been positioned on the centerlines of the respective gores 28-32. The adjacent gores may be attached to one another by placing respective envelope gores on top of each other and heat sealing the common edge on one side of the envelope gore to form an edge seam. As shown in FIG. 4B, edge seam 28-29 is formed between envelope gores 28 and 29, edge seam 29-30 is formed between envelope gores 29 and 30, edge seam 30-31 is formed between envelope gores 30 and 31, and edge seam 31-32 is formed between envelope gores 31 and 32. Fiber load tapes 28'-32' are applied to the centerlines of envelope gores 28-32 respectively. An adhesive may be applied to the back of the fiber load tapes 28'-32' before placement onto the respective envelope gores 28-32. The adhesive may be a pressure sensitive adhesive.

The heat sealing of the individual envelope gores to form seams between adjacent envelope gores, and application of the straight fiber tape to the centerlines of the envelope gores is easier to automate than the prior approach of using tape tacks to adhere the braided tendons to the balloon envelope. Thus, this balloon envelope design, and the method of making this balloon envelope design, could utilize a manufacturing process that is more automated and able to be converted to machine production, allowing for an increase in production volume and a reduction in costs. The repetitive steps of heat sealing the adjacent envelope gores and applying the fiber load tapes to the centerlines of the gores can be more readily machine controlled for tolerances.

Figure 5A:
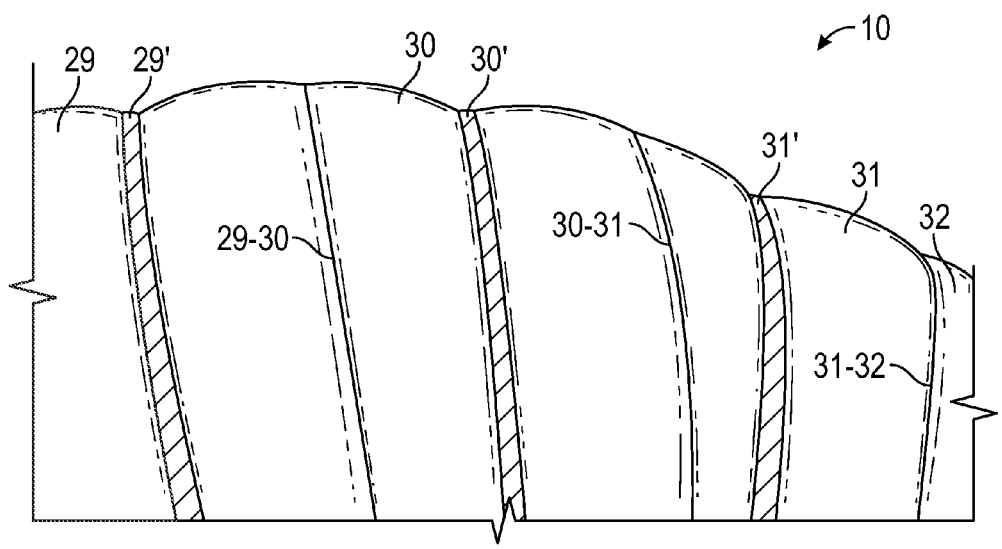
FIG. 5A is a perspective view of a portion of the balloon envelope 10 shown in FIG. 3.

FIG. 5A is a perspective view of a portion of the balloon envelope 10 shown in FIG. 3. Envelope gore 29 is attached to envelope gore 30 at edge seam 29-30. A fiber load tape 29' is shown extending down a centerline of envelope gore 29 and a fiber load tape 30' is shown extending down a centreline of envelope gore 30. It should be noted that the envelope material of envelope gores 29 and 30 and edge seam 29-30 bulge outwardly between fiber load tapes 29' and 30'. In this manner, because the centerlines of gores 29 and 30 are shorter than the edge seam 29-30, the load caused by the pressurized lifting gas within balloon envelope 10 is primarily carried by fiber load tapes 29' and 30' rather than on the envelope material and edge seam 29-30 between fiber load tapes 29' and 30'.

Similarly, envelope gore 30 is attached to envelope gore 31 at edge seam 30-31. A fiber load tape 31' is shown extending down a centerline of envelope gore 31 and a fiber load tape 30' is shown extending down a centerline of envelope gore 30. The envelope material of envelope gores 30 and 31 and edge seam 30-31 bulge outwardly between fiber load tapes 30' and 31'. Because the centerlines of gores 30 and 31 are shorter than the edge seam 30-31, the load caused by the pressurized lifting gas within balloon envelope 10 is primarily carried by fiber load tapes 30' and 31' rather than on the envelope material and edge seam 29-30 between fiber load tapes 30' and 31'.

Furthermore, envelope gore 32 is shown attached to envelope gore 31 at edge seam 31-32. Edge seams 29-30, 30-31, and 31-32 preferably are not covered by a load tape, as the design of balloon envelope 10 is designed so that the load caused by the pressurized gas within balloon envelope 10 is primarily carried by the fiber load tapes 29', 30', and 31' rather than edge seams 29-30, 30-31, or 31-32.

Figure 5B:
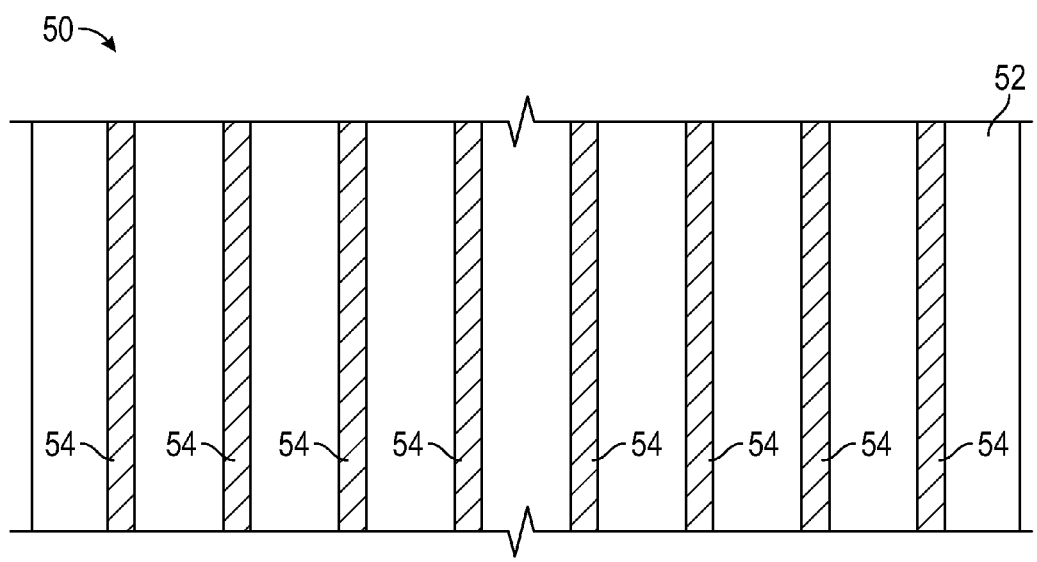
FIG. 5B is a side view of one of the fiber load tapes shown in FIGS. 3-5A, according to an example embodiment.

FIG. 5B is a side view of one of the fiber load tapes shown in FIGS. 3-5A, according to an example embodiment. Fiber load tape 50 is comprised of a tape portion 52 and a plurality of fibers 54. Fibers 54 are preferably straight fibers, such as such as dyneema fibers or UV resistant aramid fibers, although other fibers could also be used. Example embodiments could include a 7800 denier fiber load that is ½ inch wide. Tape width is driven as much by the size of the top fitting as it is by stability gained and adhesion to the envelope. A narrower tape requires less real estate at the apex and base of the envelope, reducing the size and weight of the load rings, although a wider tape allows for better adhesion to the envelope (if applied directly) and more lateral stability. However, a tape that is too wide simply folds on itself which may be problematic. A fiber load tape that is ½ inch wide provides a suitable compromise.

In some embodiments, it may be desirable to have the coefficient of thermal expansion (CTE) of the fiber tapes 50 closely match the CTE of the envelope material used in balloon envelope 12. In this manner, the balloon systems can operate during the extreme environmental temperature ranges experienced when the balloon envelope is deployed at altitude. Matching CTE's allows the tendons (whether load tape or straight fiber cable) to shorten in the cold, carrying more of the load relative to the envelope material. If the tendons do not shorten with the envelope material in the stratosphere they need to be shortened prior to flight by an equivalent amount. This shortening on the ground leads to the possibility of uneven deployment of the tendons at float. Also, the additional bunching of the envelope material during initial pressurization that exists from shorter tendons is at risk of pinching and damage.

In addition, with this design, different items may be attached to the fiber load tapes without directly contacting the balloon envelope. This provides an additional advantage of using the fiber load tapes. Furthermore, the load tapes may also include one or more metallic, reflective fiber that could make the balloon system visible to aircraft or to serve as an antenna.

Figure 6A:
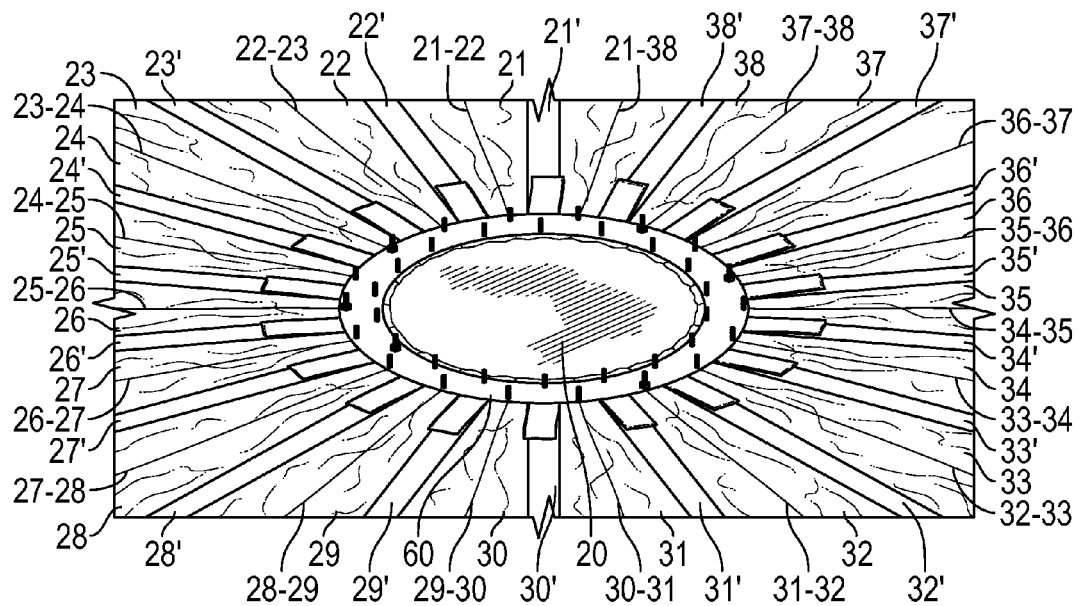
FIG. 6A is a perspective view of a portion of the top of balloon envelope 10 shown in FIGS. 3 and 5A, according to an example embodiment.

FIG. 6A is a perspective view of a portion of the top of balloon envelope 10 shown in FIGS. 3 and 5A, according to an example embodiment. A structural ring 60 is shown extending around apex 20. Each of envelope gores 21-38 are shown extending from structural ring 60. In particular envelope gore 21 is attached to adjacent envelope gore 22 at edge seam 21-22; envelope gore 22 is attached to adjacent envelope gore 23 at edge seam 22-23; envelope gore 23 is attached to adjacent envelope gore 24 at edge seam 23-24; envelope gore 24 is attached to adjacent envelope gore 25 at edge seam 24-25; envelope gore 25 is attached to adjacent envelope gore 26 at edge seam 25-26; envelope gore 26 is attached to adjacent envelope gore 27 at edge seam 26-27; envelope gore 27 is attached to adjacent envelope gore 28 at edge seam 27-28; envelope gore 28 is attached to adjacent envelope gore 29 at edge seam 28-29; and envelope gore 29 is attached to adjacent envelope gore 30 at edge seam 29-30.

Similarly, envelope gore 30 is attached to adjacent envelope gore 31 at edge seam 30-31; envelope gore 31 is attached to adjacent envelope gore 32 at edge seam 31-32; envelope gore 32 is attached to adjacent envelope gore 33 at edge seam 32-33; envelope gore 33 is attached to adjacent envelope gore 34 at edge seam 33-34; envelope gore 34 is attached to adjacent envelope gore 35 at edge seam 34-35; envelope gore 35 is attached to adjacent envelope gore 36 at edge seam 35-36; envelope gore 36 is attached to adjacent envelope gore 37 at edge seam 36-37; envelope gore 37 is attached to adjacent envelope gore 38 at edge seam 37-38, and envelope gore 38 is attached to adjacent envelope gore 21 at final edge seam 21-38. Fiber load tapes 21'-38' are adhered to the centerlines of envelope gores 21-28 respectively.

Figure 6B:
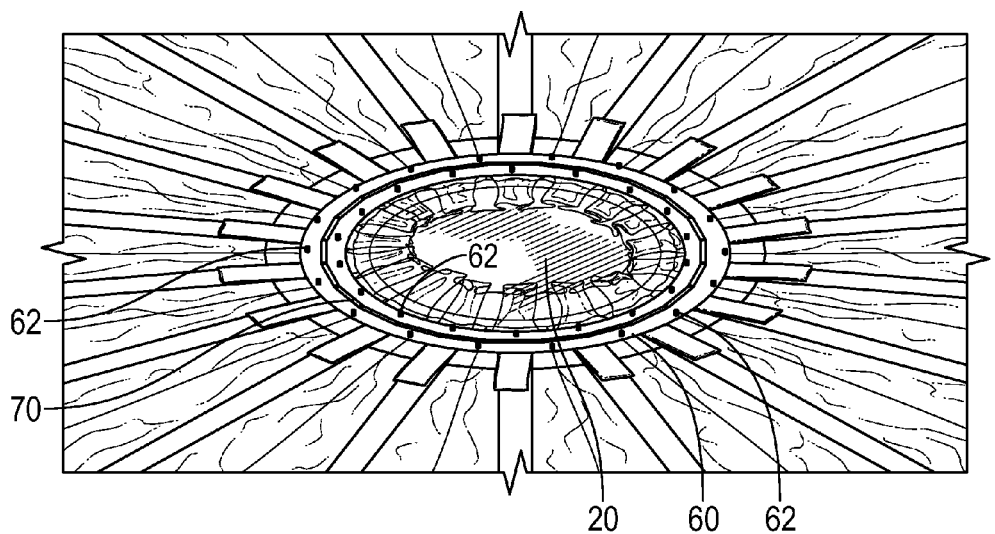
FIG. 6B is another perspective view of a portion of the top of balloon envelope 10 shown in FIGS. 3 and 5A, according to an example embodiment.

FIG. 6B is another perspective view of a portion of the top of balloon envelope 10 shown in FIGS. 3 and 5A, according to an example embodiment. A load ring 70 is positioned adjacent structural ring 60 and each of the envelope gores 21-28 and fiber load tapes 21'-38' are secured to load ring 70. Bolts 62 are used to secure the structural ring 70 and tops of the envelope gores 21-38 to the apex 20.

Figure 7:
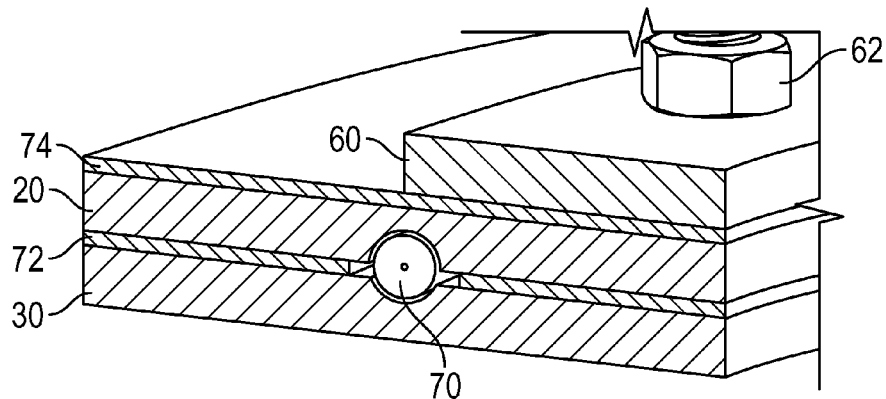
FIG. 7 is a cross-sectional view of a the connection of the balloon envelope 10 to a load ring 70 and structural ring 60 shown in FIGS. 6A and 6B, according to an example embodiment.

FIG. 7 is a cross-sectional view of a the connection of the balloon envelope 10 to a load ring 70 and structural ring 60 shown in FIGS. 6A and 6B, according to an example embodiment. In this FIG. 7, a gasket 72 is positioned about load ring 70 between envelope gore 30 and apex 20. Another gasket 74 is positioned between apex 20 and structural ring 60, and bolt 62 is used to squeeze apex 20, gaskets 72 and 74, and envelope gore 30 to form an airtight seal.

Figure 8:
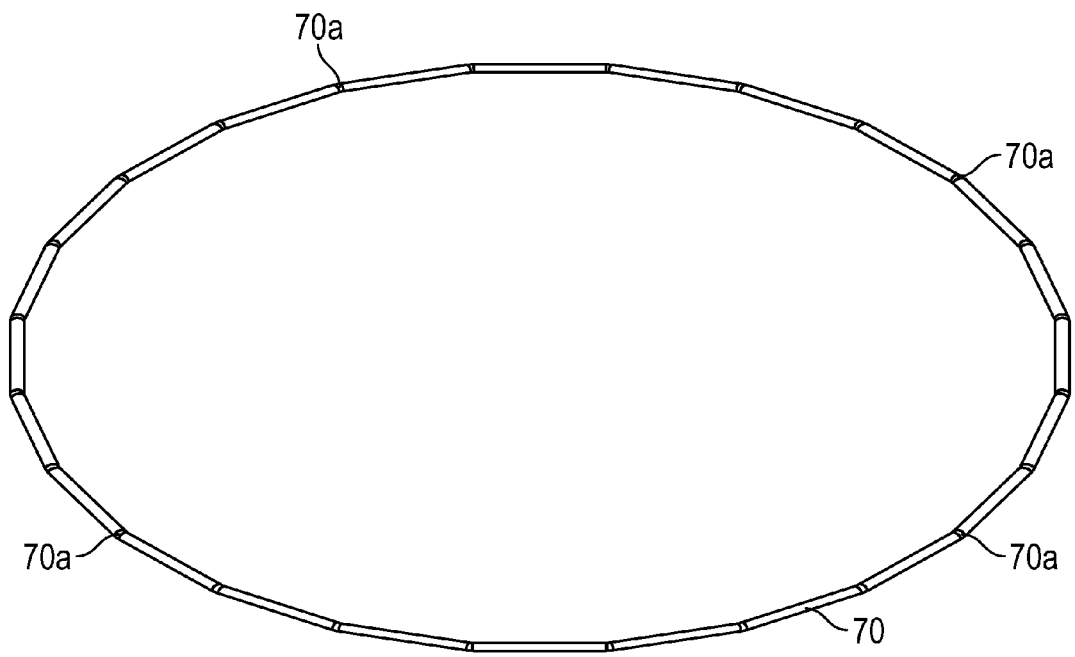
FIG. 8 is a perspective view of load ring 70 shown in FIGS. 6B and 7, according to an example embodiment.

FIG. 8 shows a perspective view of load ring 70 shown in FIGS. 6B and 7, according to an example embodiment. Load ring 70 may comprise a number of angles 70a between straight members to form load ring 70 into an overall circle.

4. EXAMPLE METHOD OF FORMING A BALLOON ENVELOPE

Figure 9:
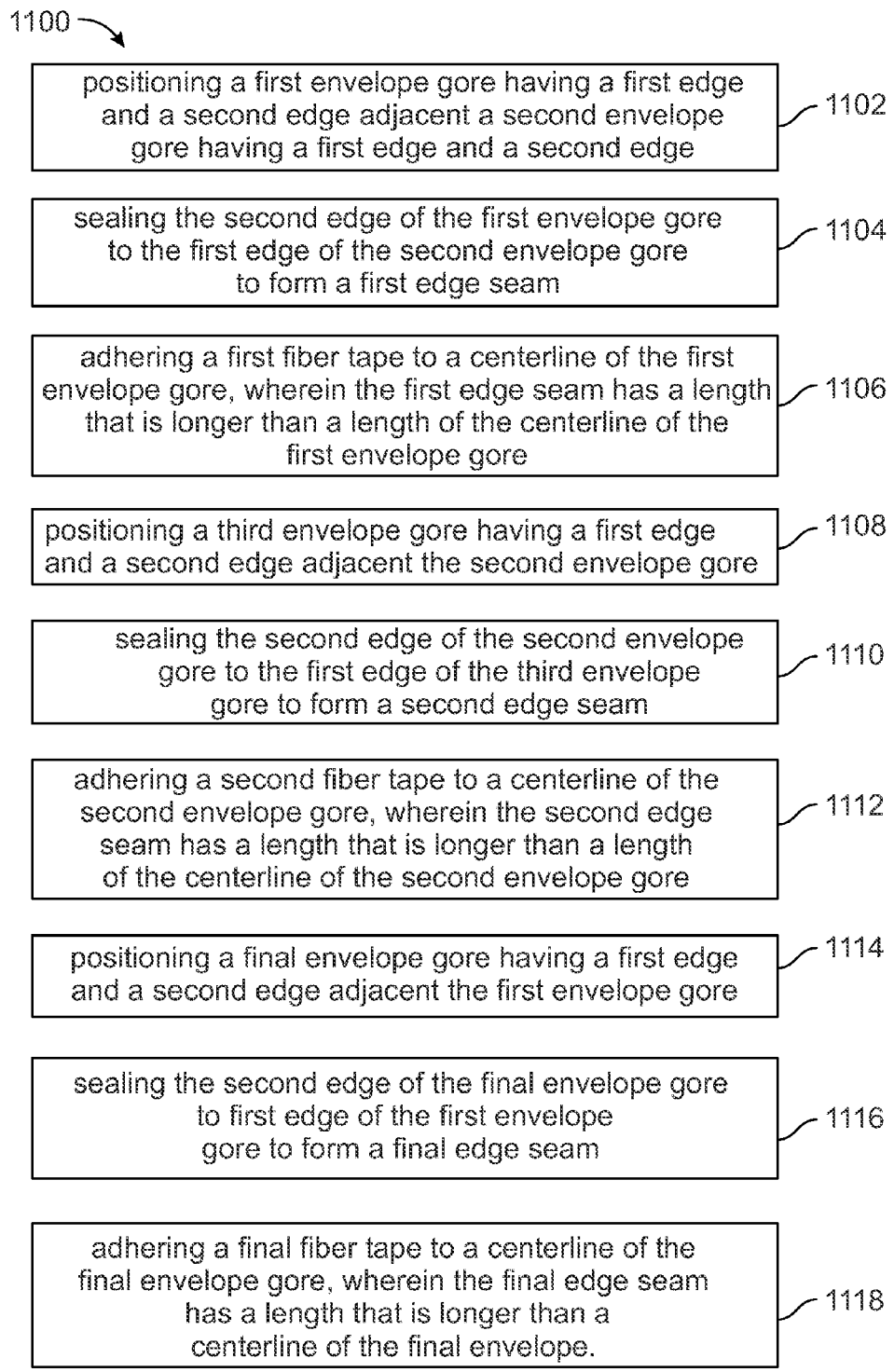
FIG. 9 is a method, according to an example embodiment.

FIG. 9 shows a method 1100 that may be used for forming a balloon envelope 10 shown in FIGS. 3, 5A, 5B, and 6A.

Method 1100 is provided that includes the step 1102 of positioning a first envelope gore having a first edge and a second edge adjacent a second envelope gore having a first edge and a second edge, the step 1104 of sealing the second edge of the first envelope gore to the first edge of the second envelope gore to form a first edge seam, the step 1106 of adhering a first fiber tape to a centerline of the first envelope gore, wherein the first edge seam has a length that is longer than a length of the centerline of the first envelope gore.

Method 1100 further includes the step 1108 of positioning a third envelope gore having a first edge and a second edge adjacent the second envelope gore, the step 1110 of sealing the second edge of the second envelope gore to the first edge of the third envelope gore to form a second edge seam, the step 1112 of adhering a second fiber tape to a centerline of the second envelope gore, wherein the second edge seam has a length that is longer than a length of the centerline of the second envelope gore.

Method 1100 further includes the step 1114 of positioning a final envelope gore having a first edge and a second edge adjacent the first envelope gore, the step 1116 of sealing the second edge of the final envelope gore to first edge of the first envelope gore to form a final edge seam, and the step 1118 of adhering a final fiber tape to a centerline of the final envelope gore, wherein the final edge seam has a length that is longer than a centerline of the final envelope.

As noted above, the adjacent envelope gores may be placed on top of each other and an edge seam may be formed between adjacent envelope gores by heat sealing a common edge of the adjacent envelope gores. Furthermore, the steps of method 1100 do not need to be performed in the exact order listed. For example, a number of envelope gores could be attached together before the fiber load tapes are attached to the centerlines of the respective envelope gores. Alternately, the fiber load tapes could be applied to some or all of the envelope gores before they are seamed together with an adjacent envelope gore. Similarly, a number of envelope gores could be lined up adjacent one another (rather than being stacked) and seamed together. Or sections of the balloon envelope could be formed and then the sections seamed together. For example, a first section having of nine envelope gores could be formed and sealed together with a second section having nine envelope gores. The fiber load tapes could be positioned on the centerlines of the gores at any point during the formation process.

5. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
    a balloon envelope formed with a plurality of adjacent continuous envelope gores sealed together at their respective edges to form an edge seam between each of the adjacent continuous envelope gores;
    a tape comprised of fibers applied to a seamless centerline of each of the continuous envelope gores;
    wherein the continuous envelope gores are constructed such that the edge seam between each of the adjacent continuous envelope gores is longer than the centerline of each of the continuous envelope gores; and
    wherein a load caused by pressurized lifting gas within the balloon envelope is carried primarily by the fiber tapes on the centerlines of the continuous envelope gores, rather than the edge seams between the adjacent continuous envelope gores.

2. The apparatus of claim 1, wherein each of the respective continuous envelope gores and fiber tapes applied to the centerlines of the continuous envelope gores extend longitudinally to a load ring positioned at a top of the balloon envelope.

3. The apparatus of claim 2, wherein each of the respective continuous envelope gores and fiber tapes are secured to the load ring and sandwiched beneath a top plate positioned at the top of the balloon envelope.

4. The apparatus of claim 2, wherein each of the respective fiber tapes has a width of ½ inch.

5. The apparatus of claim 2, wherein a pressure sensitive adhesive is applied to the respective fiber tapes before the fiber tapes are applied to the seamless centerlines of the respective continuous envelope gores.

6. The apparatus of claim 2, wherein the fibers in the respective fiber tapes are straight line fibers.

7. The apparatus of claim 6, wherein the straight line fibers are comprised of dyneema fibers or aramid fibers.

8. The apparatus of claim 2, wherein the one or more of the respective fiber tapes includes one or more metallic, reflective fibers.

9. The apparatus of claim 8, wherein the one or more reflective fibers serve as an antenna.

10. The apparatus of claim 1, wherein the respective fiber tapes are positioned within a tubular sleeve that is adhered to the respective seamless centerlines of the continuous envelope gores.

11. A method of forming a balloon envelope comprising the steps of:
    positioning a first continuous envelope gore having a first edge and a second edge adjacent a second continuous envelope gore having a first edge and a second edge;
    sealing the second edge of the first continuous envelope gore to the first edge of the second continuous envelope gore to form a first edge seam;
    adhering a first fiber tape to a seamless centerline of the first continuous envelope gore, wherein the first edge seam has a length that is longer than a length of the centerline of the first continuous envelope gore;
    positioning a third continuous envelope gore having a first edge and a second edge adjacent the second continuous envelope gore;
    sealing the second edge of the second continuous envelope gore to the first edge of the third continuous envelope gore to form a second edge seam;
    adhering a second fiber tape to a seamless centerline of the second continuous envelope gore, wherein the second edge seam has a length that is longer than a length of the centerline of the second continuous envelope gore;
    positioning a final continuous envelope gore having a first edge and a second edge adjacent the first continuous envelope gore;
    sealing the second edge of the final continuous envelope gore to the first edge of the first continuous envelope gore to form a final edge seam; adhering a third fiber tape to a seamless centerline of the third continuous envelope gore, wherein the second edge seam has a length that is longer than a length of the centerline of the third continuous envelope gore; and adhering a final fiber tape to a seamless centerline of the final continuous envelope gore, wherein the final edge seam has a length that is longer than a centerline of the final continuous envelope gore.

12. The method of claim 11, further including the step of securing the respective continuous envelope gores to a load ring at an apex of the balloon envelope.

13. The method of claim 11, wherein the steps set forth in claim 11 are performed in the exact order listed.

14. The method of claim 11, wherein the respective continuous envelope gores are comprised of polyethylene.

15. The method of claim 11, wherein the respective fiber tapes have a width of ½ inch.

16. The method of claim 11, wherein the fibers in the respective fiber tapes are straight line fibers.

17. The method of claim 16, wherein the straight line fibers are comprised of dyneema fibers or aramid fibers.

18. The method of claim 17, wherein the one or more of the respective fiber tapes includes one or more metallic, reflective fibers.

19. The method of claim 11, wherein a load caused by pressurized lifting gas within the balloon envelope is carried primarily by the fiber tapes on the centerlines of the continuous envelope gores, rather than the edge seams between the adjacent continuous envelope gores.

20. The method of claim 19, wherein the respective fiber tapes are positioned within a tubular sleeve that is adhered to the respective seamless centerlines of the continuous envelope gores.

21. An apparatus comprising:
a balloon envelope formed with a plurality of adjacent continuous envelope gores sealed together at their respective edges to form an edge seam between each of the adjacent continuous envelope gores;
a tubular sleeve adhered to a seamless centerline of each of the continuous envelope gores;
a tendon positioned within each of the respective tubular sleeves;
wherein the continuous envelope gores are constructed such that the edge seam between each of the adjacent continuous envelope gores is longer than the centerline of each of the continuous envelope gores; and
wherein a load caused by pressurized lifting gas within the balloon envelope is carried primarily by the tendons on the centerlines of the continuous envelope gores, rather than the edge seams between the adjacent continuous envelope gores.

22. The apparatus of claim 21, wherein at least some of the tendons are comprised of a fiber tape.

23. The apparatus of claim 21, wherein at least some of the tendons are comprised of a straight fiber cable.

\* \* \* \* \*